(12) United States Patent
Menger et al.

(10) Patent No.: US 7,718,041 B2
(45) Date of Patent: May 18, 2010

(54) METHOD FOR OBTAINING OLIGOMERS OF POLYTETRAHYDOFURANE OR TETRAHYDROFURANE

(75) Inventors: Volkmar Menger, Neustadt (DE); Michael Schwarztrauber, Neustadt (DE); Martin Haubner, Eppelheim (DE); Klaus-Peter Pfaff, Friedelsheim (DE)

(73) Assignee: BASF SE, Ludwigshafen (DE)

( * ) Notice: Subject to any disclaimer, the term of this patent is extended or adjusted under 35 U.S.C. 154(b) by 1020 days.

(21) Appl. No.: 10/563,421

(22) PCT Filed: Jun. 19, 2004

(86) PCT No.: PCT/EP2004/006645

§ 371 (c)(1),
(2), (4) Date: Jun. 2, 2006

(87) PCT Pub. No.: WO2005/005405

PCT Pub. Date: Jan. 20, 2005

(65) Prior Publication Data

US 2006/0266635 A1 Nov. 30, 2006

(30) Foreign Application Priority Data

Jul. 8, 2003 (DE) ................ 103 30 721

(51) Int. Cl.
- *B01D 3/10* (2006.01)
- *C07C 29/80* (2006.01)
- *C07D 307/08* (2006.01)

(52) U.S. Cl. ............. 203/80; 203/DIG. 23; 549/429; 549/509; 568/913

(58) Field of Classification Search ............ 203/41, 203/80, DIG. 23; 549/429, 509; 568/913
See application file for complete search history.

(56) References Cited

U.S. PATENT DOCUMENTS

| | | | |
|---|---|---|---|
| 3,433,829 A | 3/1969 | Dorfelt et al. | |
| 4,120,903 A | 10/1978 | Pruckmayr | |
| 5,208,385 A | 5/1993 | Kahn | |
| 5,641,857 A | 6/1997 | Dostalek | |
| 5,981,688 A | 11/1999 | Auer | |
| 6,037,381 A | 3/2000 | Beer | |
| 6,271,413 B1 | 8/2001 | Muller | |
| 6,359,108 B1 | 3/2002 | Eller | |
| 6,455,711 B1 | 9/2002 | Eller | |
| 6,716,937 B2 * | 4/2004 | Bohner et al. ............ 526/68 |
| 6,846,389 B2 * | 1/2005 | Kaibel et al. ............ 203/1 |

FOREIGN PATENT DOCUMENTS

| | | |
|---|---|---|
| DE | A 1 226 560 | 12/1964 |
| DE | A 4316138 | 11/1994 |
| DE | A 19513493 | 4/1995 |
| DE | A 44 10685 | 10/1995 |
| DE | A 19742342 | 4/1999 |
| DE | A 19758296 | 7/1999 |
| DE | A 10120801 | 11/2002 |
| JP | A 04-306228 | 4/1991 |
| WO | WO 98/51729 | 11/1998 |
| WO | WO 99/12992 | 3/1999 |

OTHER PUBLICATIONS

International Search Report dated Oct. 19, 2004.
U.S. Appl. No. 10/475,723, filed Aug. 5, 2004, Benfer, et al.

* cited by examiner

*Primary Examiner*—Virginia Manoharan
(74) *Attorney, Agent, or Firm*—Connolly Bove Lodge & Hutz LLP

(57) ABSTRACT

A process for obtaining oligomers of polytetrahydrofuran or of tetrahydrofuran copolymers from a methanolic crude product which contains polytetrahydrofuran or tetrahydrofuran copolymers and is obtained in the transesterification of the mono- and/or diesters of polytetrahydrofuran or tetrahydrofuran copolymers with methanol, which includes a) removing the majority of the methanol from the crude product in a first distillation stage, b) separating the resulting bottom product by distillation into a top fraction containing the oligomers of polytetrahydrofuran or of tetrahydrofuran copolymers, and polytetrahydrofuran or tetrahydrofuran copolymer, and c) condensing the oligomers of polytetrahydrofuran or of tetrahydrofuran copolymers out of the top fraction from stage b).

16 Claims, No Drawings

METHOD FOR OBTAINING OLIGOMERS OF POLYTETRAHYDOFURANE OR TETRAHYDROFURANE

This application claims priority from PCT/EP04/006645 filed Jun. 19, 2004 and German Application 103 30 721.4 filed Jul. 8, 2003, the disclosures of each application are incorporated herein by reference.

The invention relates to a process for obtaining oligomers of polytetrahydrofuran or of tetrahydrofuran copolymers from a methanolic crude product obtained in the transesterification of the mono- and/or diesters of polytetrahydrofuran or of tetrahydrofuran copolymers with methanol, by a two-stage distillation and subsequence condensation.

Polytetrahydrofuran, referred to hereinbelow as PTHF, which is also known as polyoxybutylene glycol, is used in the plastics and synthetic fiber industry as a versatile intermediate and serves, inter alia, to prepare polyurethane, polyester and polyamide elastomers. In addition, like some of its derivatives too, it is a valuable auxiliary in many application fields, for example as a dispersant or when deinking used paper.

PTHF is prepared industrially typically by polymerization of tetrahydrofuran, referred to hereinbelow as THF for short, over suitable catalysts. The addition of suitable reagents can be used to control the chain length of the polymer chains and thus to adjust the average molecular weight to the desired value. The control is effected by selecting the type and amount of the telogen. Such reagents are known as chain termination reagents or "telogens". The choice of suitable telogens may additionally allow functional groups to be introduced at one or both ends of the polymer chain.

Other telogens do not only function as chain termination reagents, but are also incorporated into the growing polymer chain of the PTHF. They do not only have the function of a telogen, but are at the same time a comonomer and can therefore be referred to with equal justification either as telogens or as comonomer. Examples of such comonomers are telogens having two hydroxyl groups, such as the diols (dialcohols). These may be, for example, ethylene glycol, propylene glycol, butylene glycol, 1,3-propanediol, 2-butyne-1,4-diol, 1,6-hexanediol or low molecular weight PTHF. Also suitable as comonomers are cyclic ethers such as 1,2-alkylene oxide, for example ethylene oxide or propylene oxide, 2-methyltetrahydrofuran or 3-methyltetrahydrofuran. The use of such comonomers leads, with the exception of water, 1,4-butanediol and low molecular weight PTHF, to the preparation of tetrahydrofuran copolymers, referred to hereinbelow as THF copolymers, and in this way enables the chemical modification of PTHF.

The processes carried out on the industrial scale are quite overwhelmingly two-stage, and in them, tetrahydrofuran is polymerized, for example, in the presence of fluorosulfonic acid to give polytetrahydrofuran esters and subsequently hydrolyzed to give polytetrahydrofuran.

It is especially advantageous to polymerize or copolymerize THF in the presence of $C_2$- to $C_{12}$-carboxylic anhydrides or mixtures thereof with $C_2$- to $C_{12}$-carboxylic acids, for example acetic anhydride or acetic anhydride-acetic acid mixtures, in the presence of acidic catalysts, to give mono- and/or diesters of PTHF or of THF copolymers, and to subsequently transesterify the PTHF esters or esters of THF copolymers with methanol under basic catalysis to give PTHF or THF copolymers (having terminal hydroxyl groups), as described, for example, in EP-A 38009 and DE-A 2801578.

In addition to PTHF or THF copolymers having an average molecular weight of from 500 to 10,000, the methanolic crude product obtained by the transesterification comprises low molecular weight oligomers of PTHF or of THF copolymers having an average molecular weight of from 100 to 500. It may additionally comprise impurities resulting from the process, such as sodium ions which stem from the transesterification catalyst.

The low molecular weight oligomers of PTHF or of THF copolymers have to be removed, since they affect the polydispersity and the color number of the PTHF and of the THF copolymers having an average molecular weight of from 500 to 10,000.

It is an object of the present invention to provide a process for obtaining the low molecular weight polymers of PTHF or of the THF copolymers, by which these may be removed effectively and at very low cost and inconvenience from the methanolic crude product obtained after the transesterification. In addition, the process should permit the low molecular weight oligomers to be obtained in a purity which permits their depolymerization to THF or to THF and the appropriate comonomers, and the subsequent recycling of the THF obtained by the dissociation into the polymerization.

We have found that this object is achieved by a process for obtaining oligomers of polytetrahydrofuran or of tetrahydrofuran copolymers from a methanolic crude product which contains polytetrahydrofuran or tetrahydrofuran copolymers and is obtained in the transesterification of the mono- and/or diesters of polytetrahydrofuran or tetrahydrofuran copolymers with methanol, which comprises a) removing the majority of the methanol from the crude product in a first distillation stage, and optionally recycling it into the transesterification, b) separating the resulting bottom product by distillation into a top fraction comprising the oligomers of polytetrahydrofuran or of tetrahydrofuran copolymers, and polytetrahydrofuran or tetrahydrofuran copolymer, c) condensing the oligomers of polytetrahydrofuran or of tetrahydrofuran copolymers out of the top fraction from stage b).

The invention is based on the recognition that the oligomers of PTHF or of THF copolymers obtained by the process according to the invention have a methanol content of below 2% by weight, preferably ≦1.5% by weight.

As a consequence of their low methanol content, the oligomers obtained in accordance with the invention are suitable for depolymerization processes known from the prior art, for example from DE-A 4410685, in which PTHF oligomers or oligomers of the THF copolymer are converted back to THF or to THF and comonomers. For economic reasons, the THF obtained by the depolymerization is then recycled into the polymerization of the THF.

Since methanol functions as a telogen which brings about chain breaking in the THF polymerization and on the other hand cannot be removed in the depolymerization, it is a decisive advantage of the process according to the invention that it affords oligomers having low methanol contents.

The reactant of the process according to the invention is a methanolic crude product, comprising PTHF or THF copolymers, of the transesterification of the mono- and/or diesters of PTHF or of THF copolymers, whose preparation is known per se from the prior art.

In a first step of this preparative process, a mono- and/or diester of PTHF or of THF copolymers is prepared by polymerizing THF in the presence of telogens and optionally comonomers over acidic, preferably heterogeneous catalysts.

These include, for example, catalysts based on bleaching earths, as described, for example, in DE-A 1 226 560. Bleaching earths, in particular activated montmorillonite, may be used as shaped bodies in the fixed bed or in suspension.

Also known for the polymerization of THF are catalysts based on mixed metal oxides. For instance, JP-A 04-306 228 describes the polymerization of THF in the presence of a carboxylic anhydride over a mixed metal oxide consisting of metal oxides of the formula $M_xO_y$ where x and y are integers in the range of 1-3. Examples mentioned are $Al_2O_3$—$SiO_2$, $SiO_2$—$TiO_2$, $SiO_2$—$ZrO_2$ and $TiO_2$—$ZrO_2$.

U.S. Pat. No. 5,208,385 discloses catalysts based on amorphous silicon/aluminum mixed oxides. Also known are mixed oxides based on $SnO_2/SiO_2$, $Ga_2O_3/SiO_2$, $Fe_2O_3/SiO_2$, $In_2O_3/SiO_2$, $Ta_2O_5/SiO_2$ and $HfO_2/SiO_2$. The aforementioned catalysts are preferably prepared by coprecipitation/sol gel methods. DE-A 44 33 606 discloses supported catalysts in which tungsten oxides or molybdenum oxides are applied, for example, to $ZrO_2$, $TiO_2$, $HfO_2$, $Y_2O_3$, $Fe_2O_3$, $Al_2O_3$, $SnO_2$, $SiO_2$ or ZnO. Also recommended are $ZrO_2/SiO_2$ catalysts in which the support has an alkali metal concentration of <5000 ppm.

All catalysts cited may in principle be used in extrudate form or else in suspension.

Catalysts based on acidic ion exchangers are described in U.S. Pat. No. 4,120,903 for the polymerization of THF, in particular polymers containing alpha-fluorosulfonic acid (for example Nafion®), in the presence of acetic anhydride. Also suitable for the THF polymerization are catalysts which comprise a metal and perfluoroalkylsulfonic acid anions.

In addition, known polymerization catalysts also include further optionally activated clay minerals, disclosed, for example, in WO 94/05719, WO 96/23833, WO 98/51729, WO 99/12992 and DE-A 195 134 93. The zeolites are also suitable as catalysts and are described, for example, in DE-A 43 16 138. Finally, suitable polymerization catalysts also include sulfated zirconium oxides, sulfated aluminum oxides, supported heteropolyacids and suitable ammonium bifluoride ($NH_4F.HF$ or antimony pentafluoride). Preference is given to carrying out the process according to the invention with activated bleaching earths.

A useful pretreatment of the catalysts is, for example, drying with gases, for example air or nitrogen, heated to from 80 to 200° C., preferably from 100 to 180° C.

The polymerization is generally carried out at temperatures of from 0 to 80° C., preferably from 25° C. to the boiling temperature of THF. The pressure employed is generally not critical for the result of the polymerization, which is why operation is generally effected at atmospheric pressure or under the autogenous pressure of the polymerization system.

To prevent the formation of ether peroxides, the polymerization is advantageously carried out under an inert gas atmosphere. Useful inert gases include, for example, nitrogen, carbon dioxide or the noble gases; preference is given to using nitrogen.

The process may be operated batchwise or continuously, but is preferably operated continuously for economic reasons.

Since the telogen leads to chain termination, the amount of telogen used can be used to control the average molecular weight of the polymer to be prepared. Suitable telogens are carboxylic anhydrides and/or carboxylic acids in the preparation of mono- and diesters of polyTHF. Preference is given to using organic carboxylic acids or their anhydrides. These include aliphatic and aromatic poly- and/or monocarboxylic acids which contain from 2 to 12, preferably from 2 to 8, carbon atoms; preferred examples of aliphatic carboxylic acids are acetic acid, acrylic acid, lactic acid, propionic acid, valeric acid, caproic acid, caprylic acid and pelargonic acid, of which acetic acid is preferred. Examples of aromatic carboxylic acids are phthalic acid and naphthalenecarboxylic acid. Examples of anhydrides of aliphatic polycarboxylic acids are acrylic acid-succinic anhydride and -maleic anhydride. Particular preference is given to acetic anhydride.

The concentration of the carboxylic anhydride used as a telogen in the reaction mixture (feed) fed to the polymerization reactor is between 0.03 and 30 mol %, preferably from 0.05 to 20 mol %, more preferably from 0.1 to 10 mol %, based on the THF used. When a carboxylic acid is used additionally, the molar ratio in the feed of the proceeding polymerization is typically from 1:20 to 1:20,000, based on carboxylic anhydride used.

The mono- and diesters of THF copolymers can be prepared by the additional use of cyclic ethers as comonomers which can be polymerized by ring opening, preferably three-, four- and five-membered rings, such as 1,2-alkylene oxides, e.g. ethylene oxide or propylene oxide, oxetane, substituted oxetanes such as 3,3-dimethyloxetane, the THF derivatives 2-methyltetrahydrofuran or 3-methyltetrahydrofuran, and particular preference is given to 2-methyltetrahydrofuran or 3-methyltetrahydrofuran.

It is equally possible to use $C_2$- to $C_{12}$-diols as comonomers. These may be, for example, ethylene glycol, propylene glycol, butylene glycol, 1,3-propanediol, 2-butyne-1,4-diol, 1,6-hexanediol or low molecular weight PTHF. Also suitable as comonomers are cyclic ethers such as 1,2-alkylene oxides, for example ethylene oxide or propylene oxide, 2-methyltetrahydrofuran or 3-methyltetrahydrofuran.

Depending on the telogen content of the polymerization mixture, it is possible using the process to selectively prepare mono- and/or diesters of PTHF or of THF copolymers having average molecular weights of from 250 to 10,000 daltons; preference is given to using the process according to the invention to prepare the relevant PTHF esters with average molecular weights of from 500 to 5000 daltons, more preferably from 650 to 4000 daltons. In this application, the term "average molecular weight" or "average molar mass" refers to the number-average molecular weight $M_n$ of the polymers, which is determined by wet-chemical OH number determination.

The THF-containing effluent from the polymerization stage is filtered in order to retain traces of the polymerization catalyst, and afterwards fed to the distillative THF removal. However, it is also possible to first remove THF and then free the remaining mono- or diesters of PTHF of catalyst residues by filtration. The second method is preferred. The filtering device is used by industrially customary layer filtration.

The ester groups in the polymers obtained in this way have to be converted in a second step. A method which is customarily used here is the reaction with lower alcohols initiated by alkaline catalysts. The transesterification with alkaline catalysts is known from the prior art and described, for example, in DE-A 101 20 801 and DE-A 197 42 342.

In the preparation of the methanolic crude product for the process according to the invention, the lower alcohol used is methanol. The active transesterification catalyst used is sodium methoxide.

Accordingly, for the transesterification, the mono- or diesters of PTHF or of THF copolymers, obtained by the polymerization, are initially admixed with methanol. The contents of mono- and/or diacetate in the methanol should be between 20 and 80% by weight. Sodium methoxide is then added in an amount of from 50 to 1000 ppm.

Since the methanolic crude product obtained by the transesterification may still contain sodium ions from the transesterification catalysts, preference is given to initially passing the crude product through at least one ion exchanger in the presence of a catalytic amount of water. The performance of this ion exchanger treatment is disclosed in DE-A 197 58 296, which is explicitly referred to here. Preference is given to using a strongly acidic ion exchanger in gel form. The methanolic crude product freed of the catalyst is preferably also filtered through an industrially customary simplex filter and then fed to the process according to the invention.

The first distillation of the methanolic crude product (stage a)) is operated at slightly elevated pressure, preferably at from 20 mbar to 500 mbar gauge, more preferably at from 20 to 250 mbar gauge and especially preferably at from 20 to 150 mbar gauge. The temperature in this distillation is between 50 and 250° C., preferably between 50 and 200° C. and more preferably from 100 to 190° C. This first distillation stage removes the majority of the methanol present in the crude product, more than 95%. The distillation is carried out in distillation apparatus known per se, preferably in an evaporator stage. The methanol is removed overhead, while the bottom product obtained is a fraction comprising PTHF or THF copolymers having a molecular weight of from 500 to 10,000 and low molecular weight oligomers of PTHF and of THF copolymers. The methanol removed is preferably recycled into the transesterification.

On the other hand, the bottom product obtained in stage a) which still has a residual content of methanol of preferably less than 5% by weight is fed to the second distillation stage. The second distillation (stage b)) is operated at an absolute pressure of from 1 to 300 mbar, preferably from 1 to 100 mbar and more preferably from 1 to 20 mbar, at a temperature of from 50 to 250° C., preferably from 50 to 200° C. and more preferably between 100 and 190° C. The distillation of stage b) is carried out in distillation apparatus known per se, preferably in an evaporator stage. In stage b), the low molecular weight oligomers of PTHF or of THF copolymers are removed overhead together with small traces of methanol. The bottom product removed is PTHF or THF copolymers having an average molecular weight of from 500 to 10,000.

The low molecular oligomers of PTHF or THF copolymers are then condensed out of the top fraction of stage b) at from 5 to 40° C., preferably in a condenser cooled with cooling water at an appropriate temperature. As a consequence of its low methanol content of less than 2% by weight, preferably $\leq$1.5% by weight, they are preferably consumed in the depolymerization. The THF recovered by the depolymerization may then be reused for polymerization.

The remaining methanol may be recovered by condensation from the product remaining after the condensation of the low molecular weight oligomers of PTHF or of THF copolymers by repeated condensation at −40° C., for example with a condenser cooled with drying, and recycled into the transesterification.

The invention is illustrated in detail by the examples which follow.

EXAMPLES

Molecular Weight Determination

Determination of the OH Number

The hydroxyl number refers to the amount of potassium hydroxide in mg which is equivalent to the amount of acetic acid bound in the acetylation of 1 g of substance.

The hydroxyl number is determined by the esterification of the hydroxyl groups present with an excess of acetic anhydride. After the reaction, the excess of acetic anhydride is hydrolyzed with water and back-titrated as acetic acid with sodium hydroxide solution according to the following reaction equation.

Evaporation Residue Determination

Method 1 (ER 1)

To determinate the evaporation residue, the sample which had been weighed beforehand was treated on a rotary evaporator at 140° C. and atmospheric pressure for 1 h and then at the same temperature at from 0.1 to 0.2 mbar for 1 h and weighed again. The evaporation residue was calculated as the percentage weight ratio to the starting value.

Method 2 (ER 2)

To determinate the evaporation residue, the sample which had been weighed beforehand was treated on a rotary evaporator at 140° C. and atmospheric pressure for 1 h and then at 140° C. and 125 mbar for 1 h. The evaporation residue was titrated as the percentage ratio to the starting value.

Example 1

5000 kg/h of a 60% by weight solution of PTHF having an average molecular weight of 800 were introduced into a first distillation stage operated at an elevated pressure of 100 mbar and 170° C., and separated there into a vapor stream of 2000 kg/h of methanol and a bottom stream of 3000 kg/h (% by weight: >95 of crude PTHF, <5 of methanol, determined by ER 2).

The bottom effluent of the first distillation is fed into a second distillation stage operated at an absolute pressure of 10 mbar and 170° C. and separated there into a top stream comprising the residual content of methanol and low-boiling oligomers of PTHF, and a bottom stream composed of PTHF having an average molecular weight of approx. 800.

The vapor stream of the second distillation was condensed in a condenser using cooling water at a temperature of 25° C. The remaining 10 kg/h of the condensate which had 98.5% by weight of oligomers of PTHF ($M_n$ approx. 200) and 1.5% by weight of methanol (determined to ER 1) could be fed to the depolymerization. Repeated condensation at −40° C. of the remaining vapor stream condenses out residues of the methanol which are recycled into the transesterification.

Example 2

10000 kg/h of a 60% by weight solution of PTHF having an average molecular weight of 1600 were introduced into a first distillation stage operated at an elevated pressure of 100 mbar and 170° C., and separated there into a vapor stream of 4000 kg/h of methanol and a bottom stream of 6000 kg/h (% by weight: >95 of crude PTHF, <5 of methanol, determined by ER 2).

The bottom effluent of the first distillation is fed into a second distillation stage operated at an absolute pressure of 10 mbar and 170° C. and separated there into a top stream comprising the residual content of methanol and low-boiling oligomers of PTHF, and a bottom stream composed of PTHF having an average molecular weight of approx. 1600.

The top stream of the second distillation was condensed in a condenser using cooling water at a temperature of 25° C. The remaining 5 kg/h of the condensate which had 98.5% by weight of oligomers of PTHF ($M_n$ approx. 200) and 1.5% by weight of methanol (determined to ER 1) could be fed directly to the depolymerization. Repeated condensation at −40° C. of the remaining vapor stream condenses out residues of the methanol which are recycled into the transesterification.

We claim:

1. A process for obtaining oligomers of polytetrahydrofuran or of tetrahydrofuran copolymers from a methanolic crude product which contains polytetrahydrofuran or tetrahydrofuran copolymers and is obtained in the transesterification of the mono- and/or diesters of polytetrahydrofuran or tetrahydrofuran copolymers with methanol, which comprises:
   a) removing the majority of the methanol from the crude product in a distillation stage;
   b) separating the resulting bottom product by distillation into a top fraction comprising the oligomers of polytetrahydrofuran or of tetrahydrofuran copolymers, and polytetrahydrofuran or tetrahydro furan copolymer; and
   c) condensing the oligomers of polytetrahydrofuran or of tetrahydrofuran copolymers out of the top fraction from stage b).

2. A process as claimed in claim 1, wherein the methanol removed in stage a) is recycled into the transesterification.

3. A process as claimed in claim 2, wherein distillation is effected in stage a) at from 20 to 500 mbar gauge and a temperature of from 50 to 250° C.

4. A process as claimed in claim 2, wherein distillation is effected in stage b) at an absolute pressure of from 1 to 300 mbar and at from 50 to 250° C.

5. A process as claimed in claim 2, wherein condensation is effected in stage c) at a temperature of from 5 to 40° C.

6. A process as claimed in claim 2, wherein the crude product obtained is freed before stage a) of sodium ions stemming from a transesterification catalyst by treatment with an ion exchanger.

7. A process as claimed in claim 1, wherein distillation is effected in stage a) at from 20 to 500 mbar gauge and a temperature of from 50 to 250° C.

8. A process as claimed in claim 7, wherein distillation is effected in stage b) at an absolute pressure of from 1 to 300 mbar and at from 50 to 250° C.

9. A process as claimed in claim 7, wherein condensation is effected in stage c) at a temperature of from 5 to 40° C.

10. A process as claimed in claim 7, wherein the crude product obtained is freed before stage a) of sodium ions stemming from a transesterification catalyst by treatment with an ion exchanger.

11. A process as claimed in claim 1, wherein distillation is effected in stage b) at an absolute pressure of from 1 to 300 mbar and at from 50 to 250° C.

12. A process as claimed in claim 11, wherein condensation is effected in stage c) at a temperature of from 5 to 40° C.

13. A process as claimed in claim 11, wherein the crude product obtained is freed before stage a) of sodium ions stemming from a transesterification catalyst by treatment with an ion exchanger.

14. A process as claimed in claim 1, wherein condensation is effected in stage c) at a temperature of from 5 to 40° C.

15. A process as claimed in claim 14, wherein the crude product obtained is freed before stage a) of sodium ions stemming from a transesterification catalyst by treatment with an ion exchanger.

16. A process as claimed in claim 1, wherein the crude product obtained is freed before stage a) of sodium ions stemming from a transesterification catalyst by treatment with an ion exchanger.

* * * * *